US009727447B1

(12) United States Patent
Elgarat

(10) Patent No.: US 9,727,447 B1
(45) Date of Patent: Aug. 8, 2017

(54) SYSTEM, METHOD, AND COMPUTER PROGRAM FOR AUTOMATED EXPLORATORY TESTING

(71) Applicant: Amdocs Software Systems Limited, Dublin (IE)

(72) Inventor: Sharon Elgarat, Kibbutz Mefalsim (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 21 days.

(21) Appl. No.: 14/599,299

(22) Filed: Jan. 16, 2015

(51) Int. Cl.
G06F 9/44 (2006.01)
G06F 11/36 (2006.01)

(52) U.S. Cl.
CPC ...... G06F 11/3672 (2013.01); G06F 11/3688 (2013.01)

(58) Field of Classification Search
CPC .................. G06F 11/3672; G06F 11/3688
USPC ........................................................ 717/101
See application file for complete search history.

(56) References Cited

U.S. PATENT DOCUMENTS

| 6,460,068 | B1 * | 10/2002 | Novaes .................. 718/102 |
| 6,976,246 | B1 * | 12/2005 | Rosaria .................. G06F 8/34 714/E11.157 |
| 6,980,916 | B1 * | 12/2005 | Katz et al. ................. 702/119 |
| 7,367,043 | B2 | 4/2008 | Dudkiewicz et al. |
| 7,480,900 | B1 * | 1/2009 | Zhou et al. ................. 717/132 |
| 7,653,896 | B2 * | 1/2010 | Herdeg, III ................. 717/113 |
| 7,779,374 | B1 * | 8/2010 | Hamid et al. ................. 716/136 |
| 7,984,335 | B2 * | 7/2011 | Adya et al. ................. 714/38.1 |
| 8,555,253 | B2 * | 10/2013 | Shufer et al. ................. 717/125 |
| 8,627,288 | B2 * | 1/2014 | Kimball et al. ................. 717/124 |
| 8,745,590 | B2 * | 6/2014 | Mujeeb et al. ................. 717/125 |
| 8,914,775 | B2 * | 12/2014 | Ghosh et al. ................. 717/124 |
| 9,032,370 | B2 * | 5/2015 | Chakraborty et al. ........ 717/124 |
| 9,122,799 | B1 * | 9/2015 | Elgarat |
| 2005/0044532 | A1 * | 2/2005 | Pfander .................. G06Q 10/06 717/124 |
| 2005/0251794 | A1 * | 11/2005 | Taylor et al. ................. 717/148 |
| 2006/0069995 | A1 * | 3/2006 | Thompson et al. .......... 715/700 |

(Continued)

Primary Examiner — Lewis A Bullock, Jr.
Assistant Examiner — Theodore Hebert
(74) Attorney, Agent, or Firm — Zilka-Kotab, PC

(57) ABSTRACT

A system, method, and computer program product are provided for automated exploratory testing. In use, a plurality of actions to be performed as a test flow in an exploratory test associated with at least one testing project are identified. Additionally, a plurality of additional options are identified for each performed action of the plurality of actions of the test flow that are capable of being performed instead of one or more of the plurality of actions in the test flow. Further, a graph is generated showing all combinations of the plurality of first actions and the plurality of additional options as a possible scope of the exploratory test associated with the at least one testing project. In addition, the graph is modified based on received input, the received input identifying one or more test flows to execute as the exploratory test associated with the at least one testing project. Still yet, the exploratory test associated with the at least one testing project is automatically executed in accordance with the modified graph based on the received input. Moreover, a status of the automatic execution of the exploratory test associated with the at least one testing project is reported utilizing the graph.

13 Claims, 4 Drawing Sheets

(56) References Cited

U.S. PATENT DOCUMENTS

| | | | |
|---|---|---|---|
| 2006/0129418 A1* | 6/2006 | Lee et al. | 705/1 |
| 2006/0195747 A1* | 8/2006 | Pramanick et al. | 714/742 |
| 2007/0028217 A1* | 2/2007 | Mishra et al. | 717/124 |
| 2008/0005628 A1* | 1/2008 | Underdal et al. | 714/57 |
| 2008/0010537 A1* | 1/2008 | Hayutin et al. | 714/38 |
| 2009/0240987 A1* | 9/2009 | Adya et al. | 714/38 |
| 2010/0180258 A1* | 7/2010 | Takahashi | 717/124 |
| 2011/0061104 A1* | 3/2011 | Sarraute Yamada et al. | 726/23 |
| 2011/0107153 A1* | 5/2011 | Shufer et al. | 714/45 |
| 2012/0110550 A1* | 5/2012 | Ghosh et al. | 717/126 |
| 2012/0173998 A1* | 7/2012 | Chaturvedi et al. | 715/762 |
| 2013/0117611 A1* | 5/2013 | Chakraborty et al. | 714/33 |
| 2013/0174178 A1* | 7/2013 | Chakraborty et al. | 718/105 |
| 2013/0263100 A1* | 10/2013 | Mizrachi et al. | 717/149 |
| 2014/0082594 A1* | 3/2014 | Li et al. | 717/126 |

* cited by examiner

SYSTEM, METHOD, AND COMPUTER PROGRAM FOR AUTOMATED EXPLORATORY TESTING

FIELD OF THE INVENTION

The present invention relates to software testing projects, and more particularly to efficiently generating and executing software testing projects.

BACKGROUND

The testing of software is a critical step in the software development lifecycle. The objective of the testing is to verify and validate the integration of the software, the hardware and the configuration thereof, and to prevent malfunction of the software when in use.

Crucial steps to avoiding inefficiencies in software testing include developing and managing effective test plans. Test planning is a stage in all testing projects where test managers prepare the project and organize in deliverable documents the strategy, resources, travels, and overall project plan for all activities needed in the project. Current techniques for planning and executing testing projects fail to provide an efficient automated approach to test planning and execution.

There is thus a need for addressing these and/or other issues associated with the prior art.

SUMMARY

A system, method, and computer program product are provided for automated exploratory testing. In use, a plurality of actions to be performed as a test flow in an exploratory test associated with at least one testing project are identified. Additionally, a plurality of additional options are identified for each performed action of the plurality of actions of the test flow that are capable of being performed instead of one or more of the plurality of actions in the test flow. Further, a graph is generated showing all combinations of the plurality of first actions and the plurality of additional options as a possible scope of the exploratory test associated with the at least one testing project. In addition, the graph is modified based on received input, the received input identifying one or more test flows to execute as the exploratory test associated with the at least one testing project. Still yet, the exploratory test associated with the at least one testing project is automatically executed in accordance with the modified graph based on the received input. Moreover, a status of the automatic execution of the exploratory test associated with the at least one testing project is reported utilizing the graph.

DETAILED DESCRIPTION

Figure 1:
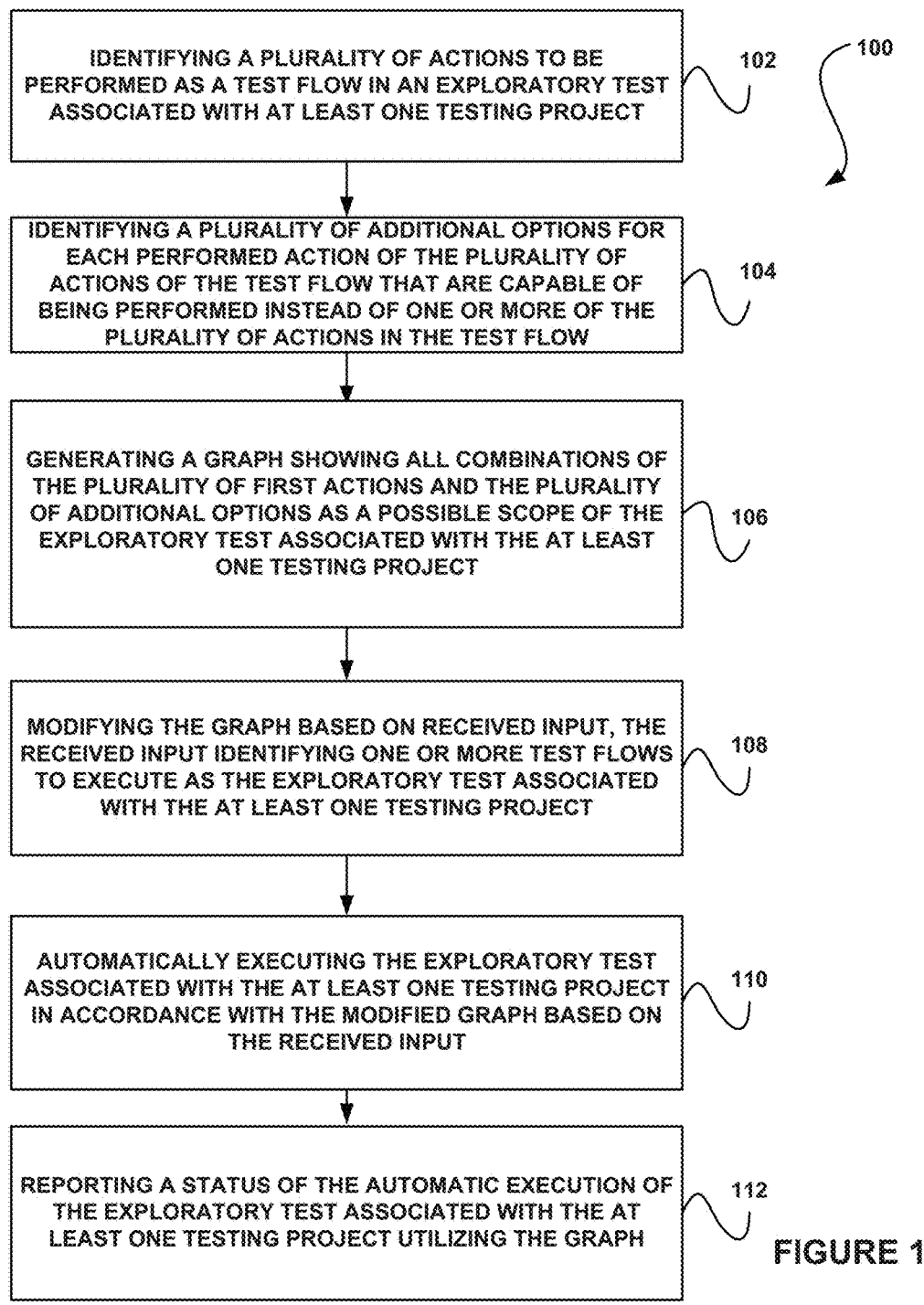
FIG. 1 illustrates a method for automated exploratory testing, in accordance with one embodiment.

FIG. 1 illustrates a method 100 for automated exploratory testing, in accordance with one embodiment.

As shown, a plurality of actions to be performed as a test flow in an exploratory test associated with at least one testing project are identified. See operation 102.

The exploratory test may include any type of test associated with the testing project. The testing project may include any type of software testing project and may be a portion of a larger testing project or an entire project. Moreover, the testing project may be associated with any industry, such as the telecommunications industry, etc.

The actions to be performed as part of the test may include any step, process, method, or other action associated with the test. The actions may be identified by a user configuring the test. The actions may describe tests within a flow. For example, the user may select or define the actions to perform as part of the test and associated parameters, etc., utilizing a user interface. Each action may be documented as a reusable automated test that can be utilized in a completely automated test or partially automated test.

Additionally, while performing the initial flow, for each of the first actions in the flow the user may define a plurality of additional actions that are capable of being performed as added options instead of the first action in the flow as the exploratory test associated with the at least one testing project are identified. See operation 104. In this case, the user may identify actions that may be performed as part of the test, but that user has not specifically elected to perform. Each additional action may be documented as a reusable automated test that can be utilized in a completely automated test or partially automated test.

Further, a graph may be automatically generated by the system showing the complete scope of test flows for the exploratory test. See operation 106. In this case, the exploratory scope of test flows include the exponential combinations of flows in which at each step in the flow a member is selected from the plurality of first actions and added actions defined for that step in the flow to be performed as at least part of the exploratory test associated with the at least one testing project.

Moreover, the graph is modified based on received input. See operation 108. The received input identifies one or more test flows to execute as the exploratory test associated with the at least one testing project. The graph may be modified automatically by the system to reflect the updated scope for automated exploratory tests.

Furthermore, the exploratory tests associated with the at least one testing project are automatically executed in accordance with the modified graph based on the received input. See operation 110.

In addition, the status of the test execution may be automatically updated utilizing the graph. See operation 112. The reflection of the results from the automated exploratory tests associated with the testing project may be shown on the graph modified by the received inputs.

The input may be received by a user utilizing a user interface. In one embodiment, the graph may be configurable such that the user may edit the graph to select/unselect test flows and/or activities to be performed as part of the test.

For example, the graph may include a directed acyclic graph (DAG). Further, the directed acyclic graph may show optional test flows that can be performed, including the plurality of multiple additional actions for each decision point in the flow that could be performed as at least part of the exploratory test as branches in the directed acyclic graph.

In this case, in one embodiment, the received input may include an indication of one or more test flows not to use as at least part of the exploratory test. For example, the received input may include a deletion of a branch of the directed acyclic graph indicating an associated test flow is not to be used as at least part of the exploratory test.

As another option, the received input may include an indication of one or more test flows to use as at least part of the exploratory test. In this case, the received input may include a selection of a branch of the directed acyclic graph indicating an associated test flow is to be used as at least part of the exploratory test. Of course, the graph may also allow for selection/deletion of specific activities within a test flow/path also.

In either case, the test may be executed in accordance with the test flows defined in the graph. In various embodiment, the execution may include a full tree execution of the graph, a limited random execution of the graph, a limited priority execution of the graph, a limited manual selection execution of the graph, or a single path execution of the graph.

Additionally, in one embodiment, the graph may be displayed during execution of the exploratory test. In this case, the graph may indicate successes, failures, and various other statuses of test flows or activities within test flows. For example, the graph may indicate an activity in a path (i.e. in a test flow) that executed successfully, an activity in a path executed but that ended with failure, an activity in a path that was scheduled for execution but was blocked by a failure in an earlier activity in an associated test flow, and/or an activity that was scheduled for execution and has not started running. In various embodiments, these statuses may be indicated using text, icons, colors, shading, and/or in various other manners.

Thus, the method 100 may be implemented by a system to generate new exploratory tests for software testing and execute them, using descriptive programming to design the road not taken, build the tests for it, and execute the tests without a user ever performing those scenarios or exact activities. The method 100 may be utilized to implement a descriptive programming tool (i.e. user interface, etc.) that allows the user to mark in the tool which type of action the user is about to perform, thus allowing the tool to generate an automation script for the action as the user performs the action. Thus, an automation script may be generated for each manual action a user performs, such that actions are capable of being performed automatically.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
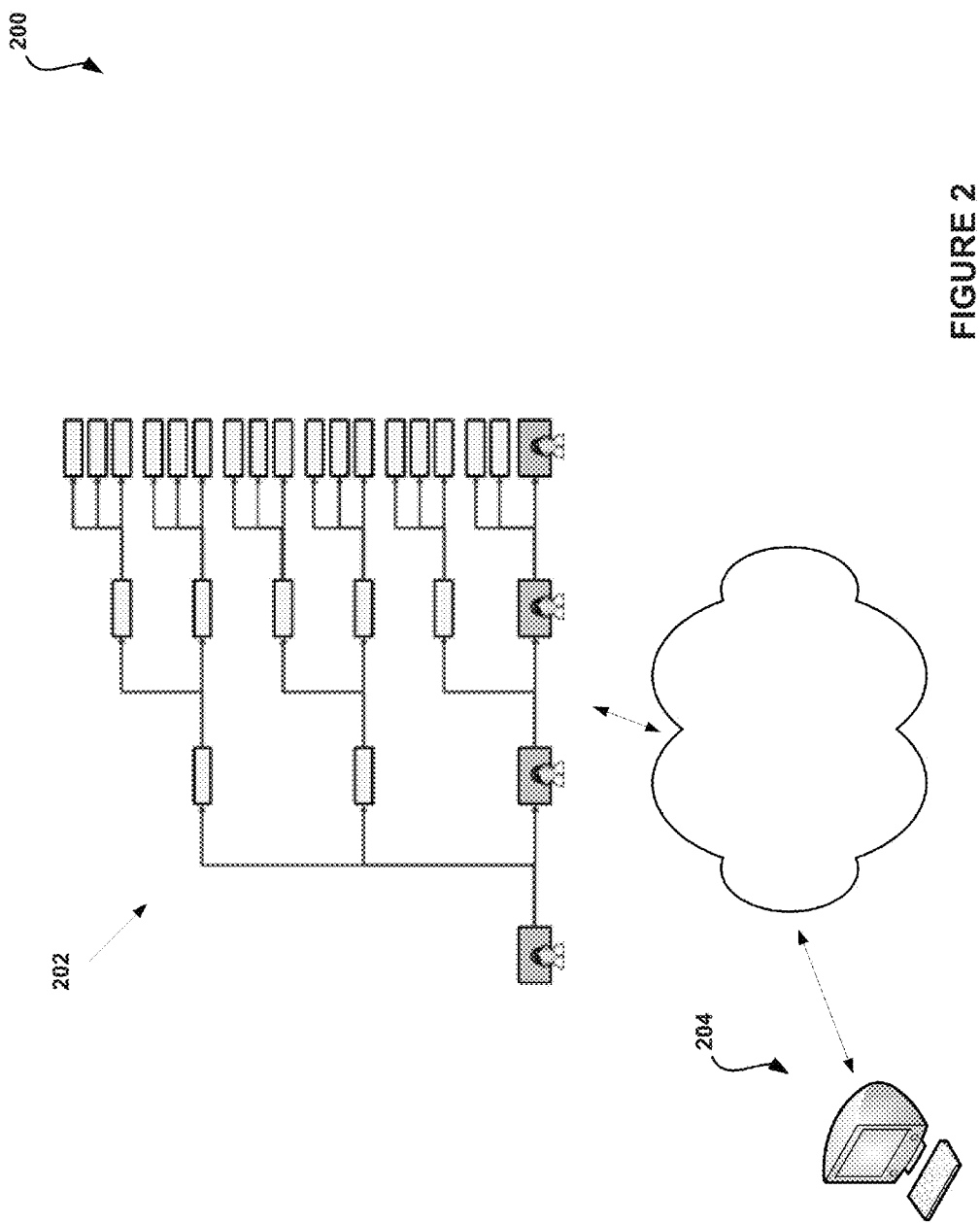
FIG. 2 illustrates a system flow for automated exploratory testing, in accordance with one embodiment.

FIG. 2 illustrates a system 200 for automated exploratory testing utilizing descriptive programming, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown, the system 200 includes a test planning system 204 including a testing software platform that may be accessed over one or more networks or that may be stored locally by the test planning system 204.

The system 204 may function to generate new exploratory tests for software testing and to execute them, using descriptive programming to design the path not taken, build the tests for it, and execute the tests without a user ever performing those scenarios or exact activities. The system 204 may be utilized to implement a descriptive programming tool (i.e. a user interface 202, etc.) that allows the user to mark in the tool which type of action the user is about to perform, thus allowing the tool to generate an automation script for the action as the user performs the action.

In one embodiment, the descriptive programming automation tool may be enhanced to request from the user to mark for an action which other options the user could have performed at this point but is not performing, before moving to perform the actual action. The system 204 may manage both the actions performed and the actions not performed and generates a directed acyclic graph (DAG) view 202 of the possible options.

Utilizing a user interface, the user may remove branches from the graph 202 that represent invalid options and select the branches to execute. The results may be presented to the user based on the DAG view with an option to drill down into a specific path of the graph to see detailed results.

The system 200 functions to reduce the ratio of manual activities to a scale of log(n), building a tree of possible paths over a single executed flow. The system 200 also functions to enrich automation from learning done during test execution, thus enabling new automation creation during exploratory tests. The system 200 also empowers agile testing, allowing agile projects with only narrow test design periods to increase exponentially the number of tests executed.

The system 200 may also be utilized to produce automation for black box systems, generating massive automation even without system detailed documentation. The system 200 may also be utilized to generate reliable automation, automating from manual experiences. The system 200 may also be utilized to generate comprehensive reporting, reporting from the overall DAG view with zoom in capability to a detailed path state.

Cutting edge existing automation allows manual testing experts to automate manual activities using descriptive programming capabilities. Descriptive programming hides the scripts code from the user by presenting predefined functions as icons in the GUI of the automation tool, and allowing the user to identify the objects those functions are to be applied, thus generating the code in the background.

Cutting edge existing manual testing methodologies, called exploratory testing, call for manual testing experts to apply an evolving learning process during their execution process. This allows expanding the scope of execution with added tests that did not exist in the original test design.

This technique proves to be extremely efficient as many of the root causes of defects come from aspects that were not clear to the system's designer and therefore could not be described in documents for test designers to consider in their designed test cases.

An ability to combine the exploratory testing agility with the descriptive programming mass rapid automation production, places this system 200 as a leap in testing evolution, exponentially increasing the efficiency produced from each manual tester's action during test execution.

One key implementation of the system 200 is the development of a new feature into existing descriptive programming based automation platforms. The new feature allows defining a chain of actions within a flow as one option out of several for this section of the flow.

The feature at this point allows the user the capability of defining additional options which in an alternate test can be used to replace the finally selected activity for this test. In case it is needed, to describe the next option a 'revert back' after each option may be done by the user.

Each optional activity can contain one or more actions. The feature provides the user with an ability to define the start and end of each option. This element of the system 200 generates the automated exploratory range of options which may be stored in the tool as a tree of optional paths. At this point, the tool considers every combination of options along the flow as a possible path.

The tree of possible paths generated by the exploratory descriptive programming is put in to the DAG (acyclic graph) view 202 generated by the system 204. The tree is built starting from the last activity in the flow, spreading its options and recursively stepping a step back in the flow until the first action, multiplying the tree generated so far and linking it to each of the current activity options.

As this is a pure mathematical process, it is likely to generate paths which are invalid or partially invalid. An additional new feature of the system 200 is that it allows marking paths invalid. The user can either remove an option in the tree, thus removing branches after it, or define a business rule stating two options from two different activities must never meet. Once defined, the system 204 searches for all paths which include that combination and removes it from the tree.

At the end of this stage the tree includes all possible, valid optional paths within the flow.

Once the user is done clearing invalid paths the user can chose to move to the next element of the system to start the execution of paths in the flow.

At this stage, the execution of automated test cases can be triggered on one of a variety of levels. For example, the execution of automated test cases may be triggered as a full tree level execution (running all valid paths), limited random execution (limiting the execution either by time or number of paths and allowing the system to randomly select paths), limited priority execution (limiting the execution by a number of paths and allowing the system to select paths starting from top priority and down, where path priority is defined by the sum of priorities awarded to the options in its path), limited manual selection execution (marking manually which paths to execute), and single path execution (executing paths one after the other).

The execution may be performed by the system 204 in sleep mode (without the user seeing the executed steps and without freezing the GUI of the system). The system 204 may run multiple flows in parallel or execute the flows one after the other, depending on the resources and virtual user numbers used.

The DAG view within the system 204 is used to represent graphically the overall status of the executed paths. The graph may be presented in its complete form, presenting all valid paths. In one embodiment, color language may be used to represent the state. For example, the color language may include: green for an activity in a path executed successfully; red for an activity in a path executed but ended with failure; orange for an activity in a path which was scheduled for execution but was blocked by a failure in an earlier activity in the flow; blue for an activity which was scheduled for execution but it's path has not started running; and gray for an activity that was not scheduled for execution.

The system 204 at this point allows a user to drill down in to a specific path status, getting a detailed report of a path execution. The system 204 also allows the user to cancel execution of scheduled paths. Table 1 shows variables used for calculating the manual effort versus automation effort reduction for the system of FIG. 2.

TABLE 1 n = the number of activities which can be executed in all possible valid paths (automated or manual)
x = the number of activities within one path in the flow
a = the average number of options in an activity within the flow
The formula derived from the above definitions is: $n = a^x$
$X = \log_a n$
S = the number of manual activities performed by a user who does the entire flow only once, but during, execution describes at each activity the different options it includes Therefore the formula representing the efficiency level of the system is: $S = a * \log_a n$.

Figure 3:
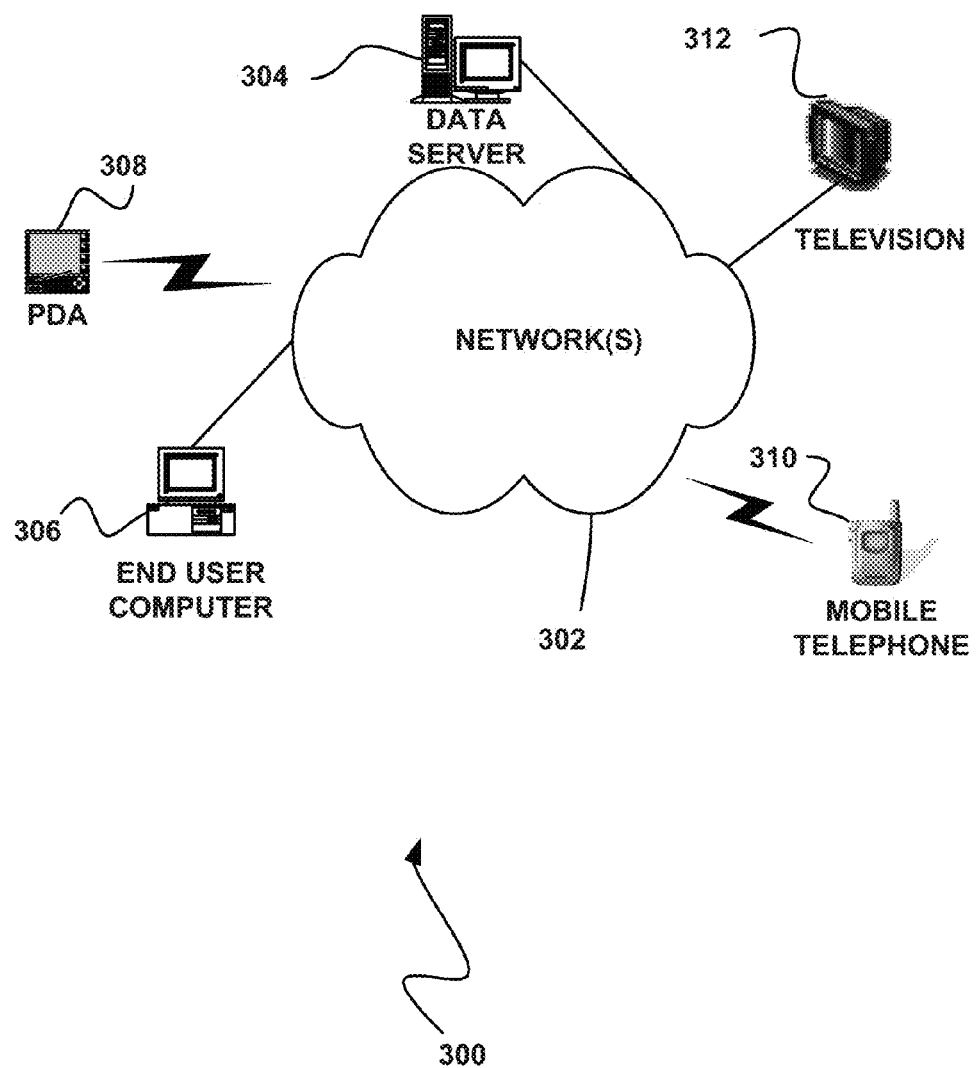
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
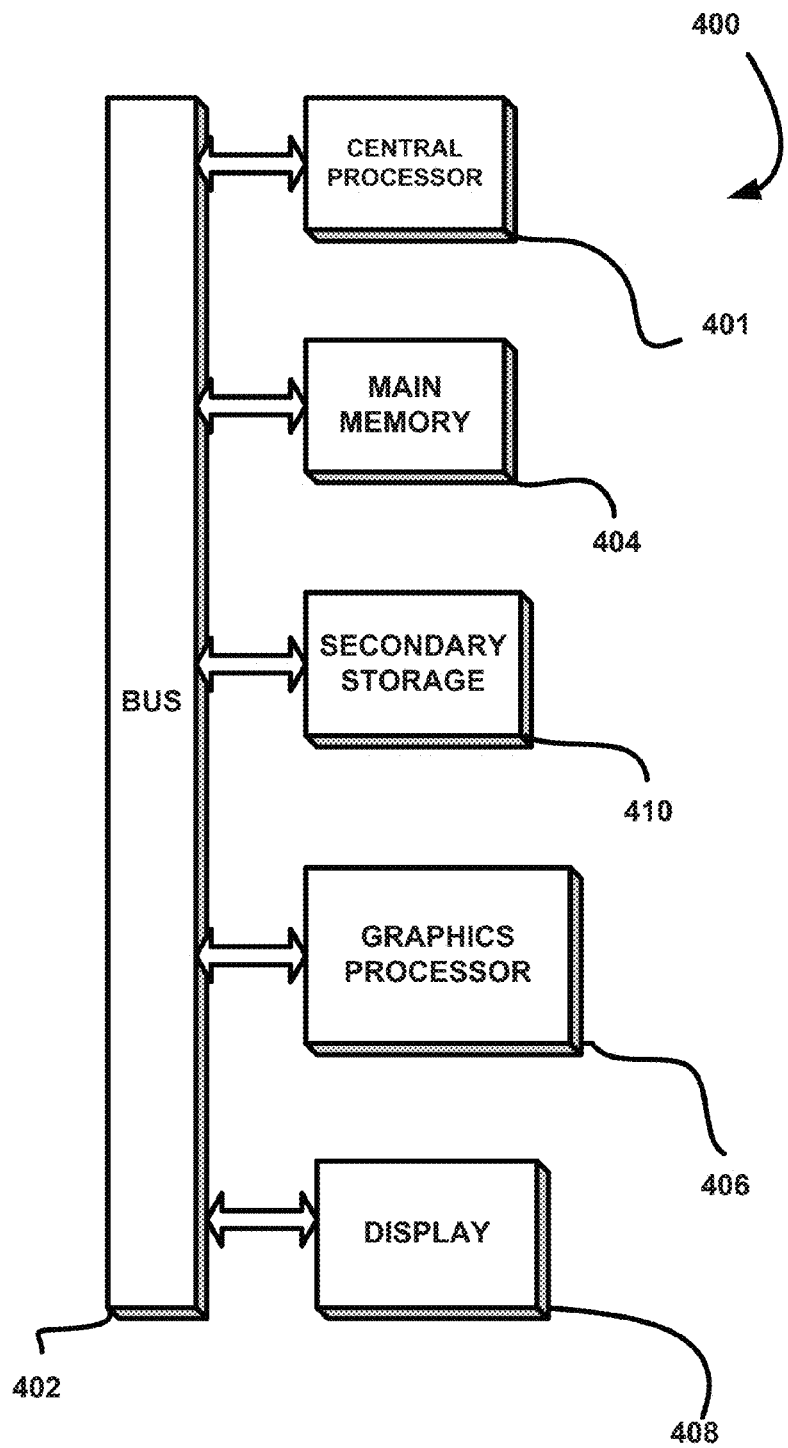
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:

computer code for receiving, from a user by a system, a plurality of actions to be performed as a main test flow in an exploratory test associated with at least one testing project, wherein at least one particular action of the plurality of the actions is received by:
  receiving from the user, through a user interface of the system, an indication of a type of action the user is about to perform,
  after receiving the indication from the user, generating, by the system, an automation script for the action as the user performs the action;
for one or more of the plurality of actions, computer code for receiving, from the user by the system, a corresponding plurality of additional options each containing one or more additional actions, including for the at least one particular action:
  receiving from the user, through a user interface of the system, an indication of additional options the user could perform for the type of action but is not performing;
computer code for automatically generating, by the system, a graph showing the main test flow as the plurality of actions, and, at each of the plurality of actions in the main test flow, showing each combination of the corresponding plurality of additional options as a separate branched test flow to the main test flow, wherein a portion of the branched test flows are invalid for the exploratory test;
computer code for displaying, through the user interface of the system, the graph;
computer code for receiving, from the user through the user interface of the system displaying the graph, an indication of one or more of the branched test flows shown on the graph that are valid and that are to be executed from the main test flow when performing the exploratory test;
computer code for modifying, by the system, the graph to include only the main test flow and the indicated one or more branched test flows, such that the graph is a tree structure having only the main test flow and the one or more of the branched test flows that are valid for the exploratory test;
computer code for automatically executing, by the system, the exploratory test associated with the at least one testing project in accordance with the modified graph; and
computer code for reporting, by the system through the modified graph shown in the user interface of the system, a status of the automatic execution of the exploratory test associated with the at least one testing project, including:
  displaying, in the user interface of the system, the modified graph during execution of the exploratory test, and
  indicating in the displayed modified graph, throughout execution of the exploratory test, a current status of each of the plurality of actions in the main test flow and of each of the additional options in the branched test flows included in the modified graph.

2. The computer program product of claim 1, wherein the computer program product is operable such that the graph includes a directed acyclic graph (DAG).

3. The computer program product of claim 1, wherein the computer program product is operable such that executing the exploratory test associated with the at least one testing project in accordance with the modified graph includes a full tree execution of the modified graph.

4. The computer program product of claim 1, wherein the computer program product is operable such that executing the exploratory test associated with the at least one testing project in accordance with the modified graph includes a limited random execution of the modified graph.

5. The computer program product of claim 1, wherein the computer program product is operable such that executing the exploratory test associated with the at least one testing project in accordance with the modified graph includes a limited priority execution of the modified graph.

6. The computer program product of claim 1, wherein the computer program product is operable such that executing the exploratory test associated with the at least one testing project in accordance with the modified graph includes a single path execution of the modified graph.

7. The computer program product of claim 1, wherein the current status of each of the plurality of actions in the main test flow and of each of the additional options in the branched test flows included in the modified graph is selected from a plurality of predefined statuses, the predefined statuses including:
  a successful execution,
  an initiated execution that failed,
  a blocked execution resulting from a failed earlier execution of one of the plurality of actions in the main test flow or the additional options, and
  a pending execution.

8. The computer program product of claim 7, wherein the predefined statuses include different ones of: text, icons, or colors.

9. The computer program product of claim 1, wherein the indication of the one or more of the branched test flows shown on the graph that are valid and that are to be executed from the main test flow when performing the exploratory test is received responsive to a selection by the user through the user interface of the one or more of the branched test flows.

10. The computer program product of claim 1, wherein the indication of the one or more of the branched test flows shown on the graph that are valid and that are to be executed from the main test flow when performing the exploratory test is received responsive to a deletion by the user through the user interface of remaining ones of the branched test flows that are invalid for the exploratory test.

11. The computer program product of claim 1, wherein the indication of the one or more of the branched test flows shown on the graph that are valid and that are to be executed from the main test flow when performing the exploratory test is a rule defined by the user through the user interface, the rule stating that two particular additional options of the plurality of additional options cannot both be included in one of the branched test flows.

12. A method, comprising:
  receiving, from a user by a system, a plurality of actions to be performed as a main test flow in an exploratory test associated with at least one testing project, wherein at least one particular action of the plurality of the actions is received by:
    receiving from the user, through a user interface of the system, an indication of a type of action the user is about to perform,
    after receiving the indication from the user, generating, by the system, an automation script for the action as the user performs the action;
  for one or more of the plurality of actions, receiving, from the user by the system, a corresponding plurality of additional options each containing one or more additional actions, including for the at least one particular action:
  receiving from the user, through a user interface of the system, an indication of additional options the user could perform for the type of action but is not performing;
automatically generating, by the system, a graph showing the main test flow as the plurality of actions, and, at each of the plurality of actions in the main test flow, showing each combination of the corresponding plurality of additional options as a separate branched test flow to the main test flow, wherein a portion of the branched test flows are invalid for the exploratory test;
displaying, through the user interface of the system, the graph;
receiving, from the user through the user interface of the system displaying the graph, an indication of one or more of the branched test flows shown on the graph that are valid and that are to be executed from the main test flow when performing the exploratory test;
modifying, by the system, the graph to include only the main test flow and the indicated one or more branched test flows, such that the graph is a tree structure having only the main test flow and the one or more of the branched test flows that are valid for the exploratory test;
automatically executing, by the system, the exploratory test associated with the at least one testing project in accordance with the modified graph; and
reporting, by the system through the modified graph shown in the user interface of the system, a status of the automatic execution of the exploratory test associated with the at least one testing project, including:
  displaying, in the user interface of the system, the modified graph during execution of the exploratory test, and
  indicating in the displayed modified graph, throughout execution of the exploratory test, a current status of each of the plurality of actions in the main test flow and of each of the additional options in the branched test flows included in the modified graph.

13. A system comprising:
a memory system; and
one or more processing cores coupled to the memory system and that are each configured to:
receive, from a user by the system, a plurality of actions to be performed as a main test flow in an exploratory test associated with at least one testing project, wherein at least one particular action of the plurality of the actions is received by:
  receiving from the user, through a user interface of the system, an indication of a type of action the user is about to perform,
  after receiving the indication from the user, generating, by the system, an automation script for the action as the user performs the action;
for one or more of the plurality of actions, receive, from the user by the system, a corresponding plurality of additional options each containing one or more additional actions, including for the at least one particular action:
  receiving from the user, through a user interface of the system, an indication of additional options the user could perform for the type of action but is not performing;
automatically generate, by the system, a graph showing the main test flow as the plurality of actions, and, at each of the plurality of actions in the main test flow, showing each combination of the corresponding plurality of additional options as a separate branched test flow to the main test flow, wherein a portion of the branched test flows are invalid for the exploratory test;
display, through the user interface of the system, the graph;
receive, from the user through the user interface of the system displaying the graph, an indication of one or more of the branched test flows shown on the graph that are valid and that are to be executed from the main test flow when performing the exploratory test;
modify, by the system, the graph to include only the main test flow and the indicated one or more branched test flows, such that the graph is a tree structure having only the main test flow and the one or more of the branched test flows that are valid for the exploratory test;
automatically execute, by the system, the exploratory test associated with the at least one testing project in accordance with the modified graph; and
report, by the system through the modified graph shown in the user interface of the system, a status of the automatic execution of the exploratory test associated with the at least one testing project, including:
  displaying, in the user interface of the system, the modified graph during execution of the exploratory test, and
  indicating in the displayed modified graph, throughout execution of the exploratory test, a current status of each of the plurality of actions in the main test flow and of each of the additional options in the branched test flows included in the modified graph.

\* \* \* \* \*